United States Patent
Dark et al.

(10) Patent No.: US 6,205,097 B1
(45) Date of Patent: Mar. 20, 2001

(54) METHOD OF ENHANCED DATA COMPRESSION RATE FOR A CD PLAYER

(75) Inventors: Jay P. Dark, Canton; Husein Taljanovic, Ann Arbor; Ylldes Zeneli, Dearborn Heights, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/226,357

(22) Filed: Jan. 6, 1999

(51) Int. Cl.⁷ ............................................ G11B 3/90
(52) U.S. Cl. ........................... 369/53.15; 369/124.06
(58) Field of Search .................... 369/47, 48, 53, 369/54, 58, 124.01, 124.06

(56) References Cited

U.S. PATENT DOCUMENTS

| | | |
|---|---|---|
| 3,997,913 | 12/1976 | Rittenbach . |
| 4,053,712 | 10/1977 | Reindl . |
| 4,110,560 | 8/1978 | Leary et al. . |
| 4,603,412 | 7/1986 | Yamazaki . |
| 4,627,090 | 12/1986 | Smith, III et al. . |
| 4,805,217 | 2/1989 | Morihiro et al. . |
| 4,839,923 | 6/1989 | Kotzin . |
| 4,860,272 | 8/1989 | Nishikawa et al. . |
| 4,916,742 | 4/1990 | Kolesmikov et al. . |
| 4,944,012 | 7/1990 | Morio et al. . |
| 5,148,417 | 9/1992 | Wong et al. . |
| 5,157,728 | 10/1992 | Schorman et al. . |
| 5,187,697 | 2/1993 | Muramatsu et al. . |
| 5,357,595 | 10/1994 | Sudoh et al. . |
| 5,471,442 | 11/1995 | Shimizume . |
| 5,611,018 | 3/1997 | Tanaka et al. . |

Primary Examiner—Paul W. Huber
(74) Attorney, Agent, or Firm—Mark L. Mollon

(57) ABSTRACT

A method of enhanced data compression rate for a CD player includes the steps of determining whether a skip is detected and setting a timer to a predetermined skip time-out period if a skip is detected. The method also includes the steps of determining whether another skip is detected during the skip time-out period, storing data from a compact disc at a predetermined compressed rate into a buffer memory if another skip is detected, and playing data at a playing rate from the buffer memory.

6 Claims, 1 Drawing Sheet

METHOD OF ENHANCED DATA COMPRESSION RATE FOR A CD PLAYER

BACKGROUND OF THE INVENTION

1. Field of the Invention

The present invention relates generally to compact disc players and, more specifically, to a method of enhanced data compression rate for a compact disc player.

2. Description of the Related Art

Recorded media is now generally available in a newer format of a digitally encoded optical disc. An audio disc is commonly referred to as a compact disc (CD). Similarly, a player of a compact disc is referred to as a CD player. The CD player reproduces an audio signal from the digital data stored on the CD as is known in the art. Multi-disc CD players are capable of storing a plurality of CDs for selection and playback. The increasing popularity of CD players in recent years has expanded their use as an audio component on a vehicle, and in particular, a motor vehicle.

A disadvantage of a CD player is its susceptibility to shock. A shock or vibration can cause an optical pick-up in the CD player to skip over some of the data encoded on the CD, resulting in a transient interruption of the audio signal. For example, a motor vehicle experiences a wide range of driving conditions, including bumpy roads. The resulting vibration of the motor vehicle from a bump in the road can cause the CD player to skip. In the past, mechanical dampers have been added to the CD player to reduce its susceptibility to shock. Another technique is to first retrieve the data from the CD at a faster rate than normal and store it in a buffer memory. The position of the data is checked within the buffer memory to detect a skip and the skip is masked out. The data is retrieved out of the buffer memory at a typical play rate. While these methods have worked well in the past for occasional shocks or vibrations, they are not as effective, if road conditions are poor, since buffer memory space is limited and an overflow can occur. Thus, there is a need in the art for a method of enhanced data compression rate to improve audio CD performance under degraded road conditions.

SUMMARY OF THE INVENTION

Accordingly, the present invention is a method of enhanced data compression rate for a CD player. The method includes the steps of determining whether a skip is detected and setting a timer to a predetermined skip time-out period if a skip is detected. The method also includes the steps of determining whether another skip is detected during the skip time-out period, storing data from a compact disc at a predetermined compressed rate into a buffer memory if another skip is detected, and playing data at a playing rate from the buffer memory.

One advantage of the present invention is that a method of enhanced data compression rate for a CD player is provided that improves audio performance by allowing for continuous audio play even if multiple skips occur. Another advantage of the present invention is that the method modifies a data sampling rate to a compressed data sampling rate if a skip is detected. Still another advantage of the present invention is that the compressed data sampling rate increases the amount of data that can be stored within a buffer memory.

Other features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
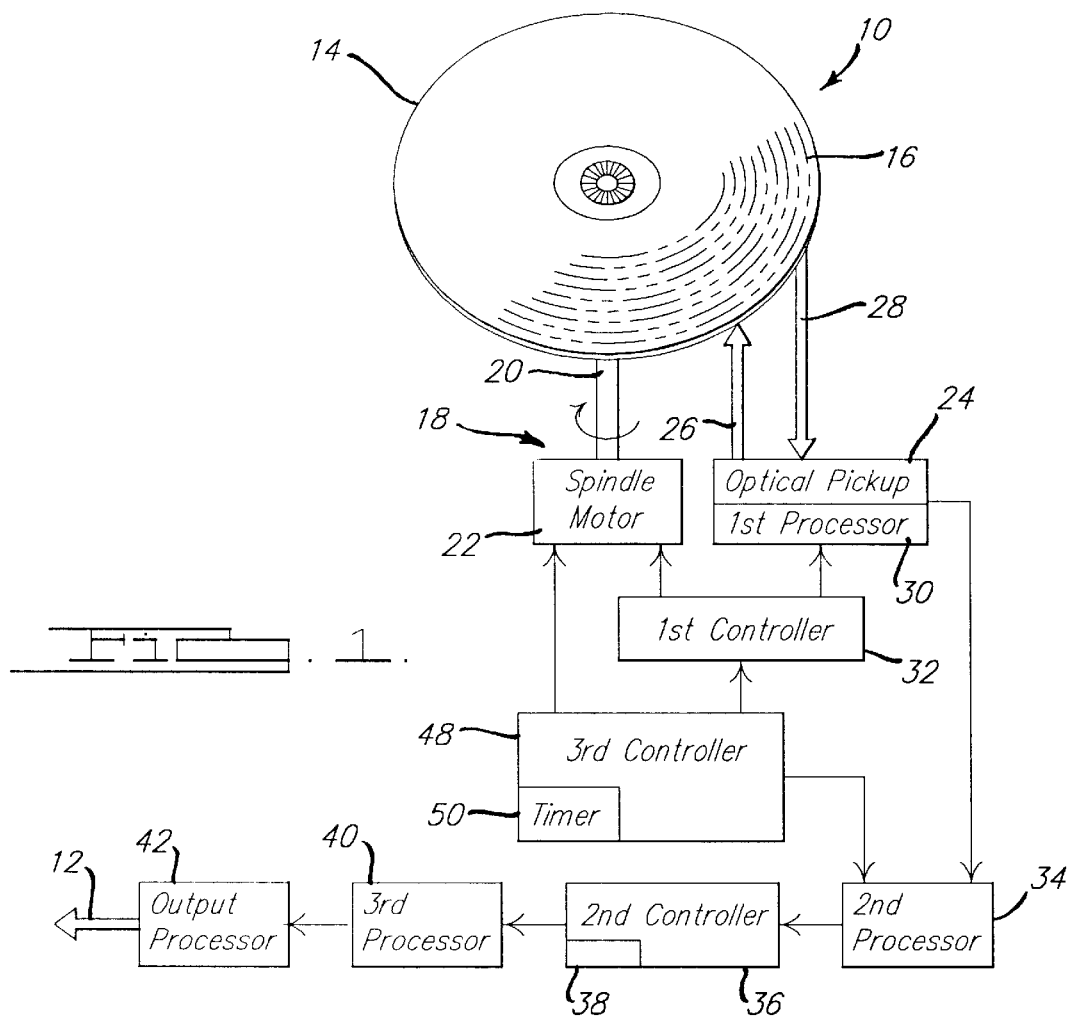
FIG. 1 is a block diagram of a CD player, for carrying out a method according to the present invention.

Referring to FIG. 1, a block diagram of a compact disc (CD) player 10 is illustrated. The CD player 10 reproduces an audio signal 12 from digital data encoded on an optical disc 14 referred to in the art as a compact disc (CD). The digital data is stored on the CD 14 in the form of pits 16 arranged in a predetermined pattern on a surface of the CD 14. The surface of the CD 14 is mirrored to reflect an optical beam in a manner to be described. It should be appreciated that the CD player 10 is conventional and known in the art.

The CD player 10 includes a spindle mechanism 18. The CD 14 is operatively connected to the spindle mechanism 18 to rotate the CD 14. The spindle mechanism 18 includes a spindle 20 and a motor 22. The CD player 10 also includes an optical pickup 24 that projects a light beam 26 onto a surface of the CD 14 and receives a reflected light beam 28 back that is representative of the digital data encoded on the CD 14. As the spindle mechanism 18 rotatably turns the CD 14 at a predetermined first rate, the optical pickup 24 moves radially across the CD 14 to read digital data from the CD 14. Preferably, the first rate is faster than a typical playing rate. The reflected light beam 28 is converted into an analog audio signal in a manner to be described.

The CD player 10 includes a first processor 30, such as a signal processor, for transforming the reflected light beam signal 28 into an analog signal that is convenient for processing in digital form. The first processor 30 is operatively connected to the optical pickup 24.

The CD player 10 also includes a first controller 32 operatively connected to the spindle mechanism 18 and the optical pickup 24. The first controller 30 operatively maintains a relative position of the CD 14 with respect to the optical pickup 24 and controls the first rate of rotation of the CD 14. Preferably, the first controller 32 includes a servo mechanism as is known in the art.

The CD player 10 includes a second processor 34 for processing the analog signal containing the digital data from the CD 14 into a usable digital signal. The second processor 34 includes an analog to digital signal processor, as is known in the art, to convert the analog signal into a digital data signal.

The CD player 10 also includes second controller 36 for further processing of the digital data signal that is operatively connected to the second processor 34. The second controller 36 includes a random access memory, also referred to as a buffer memory 38. The digital data signal is stored in a discrete data form within the buffer memory 38. The buffer memory 38 is able to accommodate a predetermined amount of data. For example, the buffer memory 38 can store up to three seconds worth of digital data. Preferably, a compression rate at which data is stored in the buffer memory 38 is a faster rate than the rate of playing an audio signal. Therefore, a larger amount of data than necessary can be stored in the buffer memory 38.

The second controller 36 checks the data stored within the buffer memory 38 for a skip and masks out the skip if detected. For example, the second controller 36 can check if each data position is sequential. If the data positions are not sequential, the data position is returned to the data position preceding the nonsequential position to mask out the skip.

The CD player 10 includes a third processor 40, such as a digital to analog signal processor, for converting the digital data into an analog audio signal for subsequent output as an audio signal. The third processor 40 is operably connected to the second controller 36 and retrieves the digital signal from the buffer memory 38 within the second controller 36 at a predetermined second rate. Preferably, the second rate is a typical rate at which the audio signal is played out.

The CD player 10 also includes an output processor 42, such as an amplifier, for playing the analog audio signal 12. The output processor 42 is operatively connected to the third processor 40. As is known in the art, the output processor 42 separates the analog audio signal 12 into two channels, a right channel and a left channel for play.

The CD player 10 includes a third controller 48 such as a microprocessor. The microprocessor 48 may include a time keeping mechanism or timer 50. The microprocessor 48 communicates with the spindle mechanism to control the rotation of the CD 14. The microprocessor 48 is in communication with the first controller 32 to control the first rate at which the data is being read by the optical pickup 24. The microprocessor 48 further communicates with the second controller 36 to control the compression rate of data being stored in the buffer memory 38 and the second rate at which the data is retrieved from buffer memory 38.

Figure 2:
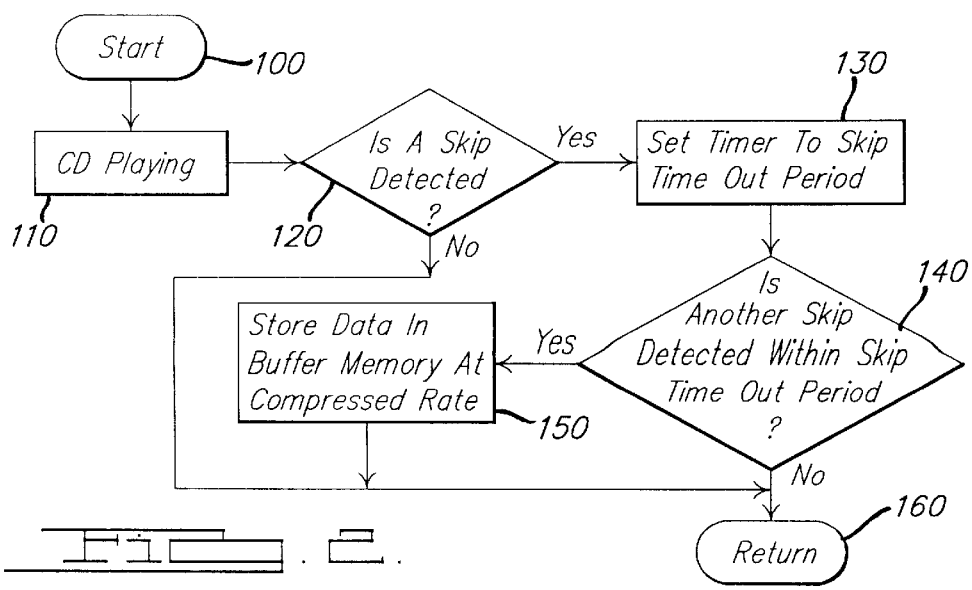
FIG. 2 is a block diagram of a method of enhanced data compression rate according to the present invention, for the CD player of FIG. 1.

Referring to FIG. 2, a method of enhanced data sampling rate according to the present invention, for the CD player 10 is illustrated. The methodology begins in bubble 100, when it is called for periodically from a main control program for the CD player 10 stored within the microprocessor 48. The methodology continues to block 110, while a CD 14 is being played by the CD player 10. The methodology advances to diamond 120.

In diamond 120, the methodology determines whether a skip is detected. For example, if data positions stored within a memory buffer 38 are not sequential, a skip has occurred. If a skip is not detected, the methodology returns to block 160, to be described. If a skip is detected, the methodology advances to block 130. In block 130, the methodology sets a timer 50 within the microprocessor 48 to a predetermined skip time-out period. The skip time-out period is an arbitrary value, such as two (2) seconds, to monitor whether another skip has occurred within that period of time.

The methodology advances to diamond 140. In diamond 140, the methodology determines whether another skip is detected during the skip time-out period. If another skip is not detected within the skip time-out period, the methodology advances to block 160 and returns to the main CD player 10 control program for the CD player 10. It should be appreciated that in the main control program the data is retrieved at a playing rate from the buffer memory 38.

Referring back to block 140, if another skip is detected within the skip time-out period, the methodology advances to block 150. In block 150, the methodology begins storing data at a predetermined compressed rate into the buffer memory 38 to enhance the amount of data stored in the buffer memory 38 over a period of time. The compressed rate is a predetermined ratio of one datum for every X-data, such as 1:4. The compressed rate reduces the number of consecutive data points stored in the buffer memory 38 to effectively increase a period of time over which data can be stored in the buffer memory 38. For example, storing one in every four data samples within the buffer memory 38 effectively increases the time period over which data points may be stored within the buffer memory 38. Advantageously, a three (3) second buffer memory 38 can be increased to six (6) seconds. Preferably, the ratio is selected such that the slightly degraded audio signal is virtually imperceptible to the listener. The methodology advances to block 160 and returns to the main control program for the CD player 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of enhanced data compression rate for a compact disc player comprising the steps of:

determining whether a skip is detected;

setting a timer to a predetermined skip time-out period if a skip is detected;

determining whether another skip is detected during the skip time-out period;

storing data from a compact disc at a predetermined compressed rate into a buffer memory if another skip is detected; and playing data at a playing rate from the buffer memory.

2. A method as set forth in claim 1 wherein the compressed rate is a ratio.

3. A method as set forth in claim 1 including a step of playing a compact disc prior to said step of determining whether a skip is detected.

4. A method as set forth in claim 1 including a step of playing data at a playing rate from the buffer memory, if another skip is not detected within the skip time-out period.

5. A method of enhanced data compression rate for a compact disc player comprising the steps of:

playing a compact disc on the compact disc player;

determining whether a skip is detected;

setting a timer to a predetermined skip time-out period if a skip is detected;

determining whether another skip is detected during the skip time-out period;

storing data from a compact disc at a predetermined compressed rate into a buffer memory if another skip has occurred during the skip time-out period and playing data at a playing rate from the buffer memory; and playing data at a playing rate from the buffer memory if another skip is not detected within the skip time-out period.

6. A method as set forth in claim 5 wherein the compressed rate is a ratio.

\* \* \* \* \*